United States Patent [19]

Lee

[11] Patent Number: 5,650,828
[45] Date of Patent: Jul. 22, 1997

[54] METHOD AND APPARATUS FOR DETECTING AND THINNING A CONTOUR IMAGE OF OBJECTS

[75] Inventor: Min-Sup Lee, Seoul, Rep. of Korea

[73] Assignee: Daewoo Electronics Co., Ltd., Seoul, Rep. of Korea

[21] Appl. No.: 518,411

[22] Filed: Aug. 23, 1995

[30] Foreign Application Priority Data

Jun. 30, 1995 [KR] Rep. of Korea ............... 95-18649

[51] Int. Cl.⁶ .................................... H04N 5/208
[52] U.S. Cl. .................... 348/625; 348/26; 382/258; 382/269
[58] Field of Search .................... 348/26, 625, 629, 348/628; 382/258, 259, 266, 268, 269; H04N 5/208

[56] References Cited

U.S. PATENT DOCUMENTS

| | | | |
|---|---|---|---|
| 3,609,685 | 9/1971 | Deutsch | 382/259 |
| 4,574,357 | 3/1986 | Pastor et al. | 382/258 |
| 5,212,740 | 5/1993 | Paek et al. | 382/266 |
| 5,335,298 | 8/1994 | Hevenor et al. | 382/258 |
| 5,379,074 | 1/1995 | Hwang | 348/625 |

Primary Examiner—John K. Peng
Assistant Examiner—Jeffrey S. Murrell
Attorney, Agent, or Firm—Anderson Kill & Olick P.C.

[57] ABSTRACT

A method for detecting and thinning a contour image of an object in a video frame comprises the steps of: (a) calculating edge magnitudes for pixels in the video frame and detecting edge points, (b) generating a contour image constituted by the detected edge points, and (c) thinning the contour image by comparing an edge magnitude for each of the edge points with each of the edge magnitudes included in a plurality of edge magnitude sets, each of the edge magnitude sets having a series of three edge magnitudes selected from the edge magnitudes corresponding to the neighboring pixels surrounding said each of the edge points.

4 Claims, 3 Drawing Sheets

| $a_2$ | $a_3$ | $a_4$ |
| --- | --- | --- |
| $a_5$ | $a_1$ | $a_6$ |
| $a_7$ | $a_8$ | $a_9$ |

METHOD AND APPARATUS FOR DETECTING AND THINNING A CONTOUR IMAGE OF OBJECTS

FIELD OF THE INVENTION

The present invention relates to a method and an apparatus for detecting and thinning a contour image of objects in a video frame, to thereby make it possible to represent the contour image with a reduced amount of digital data.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of data through the use of various data compression techniques, especially, in the case of such low bit-rate video signal encoders as video-telephone and teleconference systems.

One of such methods for encoding video signals for a low bit-rate encoding system is the so-called object-oriented analysis-synthesis coding technique (see Michael Hötter, "Object-Oriented Analysis-Synthesis Coding Based on Moving Two-Dimensional Objects", Signal Processing: Image Communication 2, 409–428(1990)).

According to the object-oriented analysis-synthesis coding technique, an input video image is divided into objects; and three sets of parameters for defining the motion, contour and pixel data of each object are processed through different encoding channels.

Needless to say, in processing a contour image of an object, the contour information is important for the analysis and synthesis of the object shape. In a feature point-based motion estimation technique, the contour information is also needed for the selection of feature points, wherein the feature points, which are defined as pixels which are capable of representing the motions of objects in the frame, are selected based on the contour information.

One of the methods to represent a contour image is an edge detection technique employing a gradient operator, e.g., a sobel operator. In this scheme, pixel intensity directional gradients for all of the pixels in the video frame are calculated by using the sobel operator, and their gradient magnitudes are obtained through the use of the directional gradients. By comparing a gradient magnitude for each pixel in the video frame with a predetermined threshold value, edge points in the video frame can be detected. (A pixel point whose gradient magnitude exceeds the predetermined threshold value is called an edge point). These detected edge points constitute a contour image. However, the contour image represented by the conventional edge detection technique normally has two or more pixel widths, requiring a substantial amount of data for the representation thereof.

SUMMARY OF THE INVENTION

It is, therefore, a primary object of the present invention to provide an improved method and apparatus for detecting and thinning a contour image of an object in a video frame, thereby providing an economical representation of the contour image with a reduced volume of digital data.

In accordance with the present invention, there is provided an apparatus, for use in a video signal encoder, for detecting and thinning a contour image of an object in a video frame, which comprises: means for calculating edge magnitudes for pixels in the video frame and detecting edge points, wherein each of the edge points represents a pixel position whose edge magnitude is larger than a predetermined threshold value, and each of said edge magnitudes represents a pixel difference between a pixel in the video frame and neighboring pixels surrounding the pixel; means for generating a contour image constituted by the detected edge points, wherein the contour image provides boundary information for tracing the object boundary in the video frame, said boundary information including position data of the pixels along the boundary of the object in the video frame and edge magnitudes corresponding to the respective pixel positions; and means for thinning the contour image by comparing an edge magnitude for each of the edge points with each of the edge magnitudes included in a plurality of edge magnitude sets, each of the edge magnitude sets having a series of three edge magnitudes selected from the edge magnitudes corresponding to the neighboring pixels surrounding said each of the edge points.

BRIEF DESCRIPTION OF THE DRAWINGS

The above and other objects and features of the present invention will become apparent from the following description of preferred embodiments given in conjunction with the accompanying drawings, in which:

FIG. 2 illustrates a diagram explaining the edge point detection scheme employed in the present invention;

FIG. 3 depicts an exemplary target edge magnitude and its neighboring edge magnitudes.

DETAILED DESCRIPTION OF THE PREFERRED EMBODIMENTS

Figure 1:
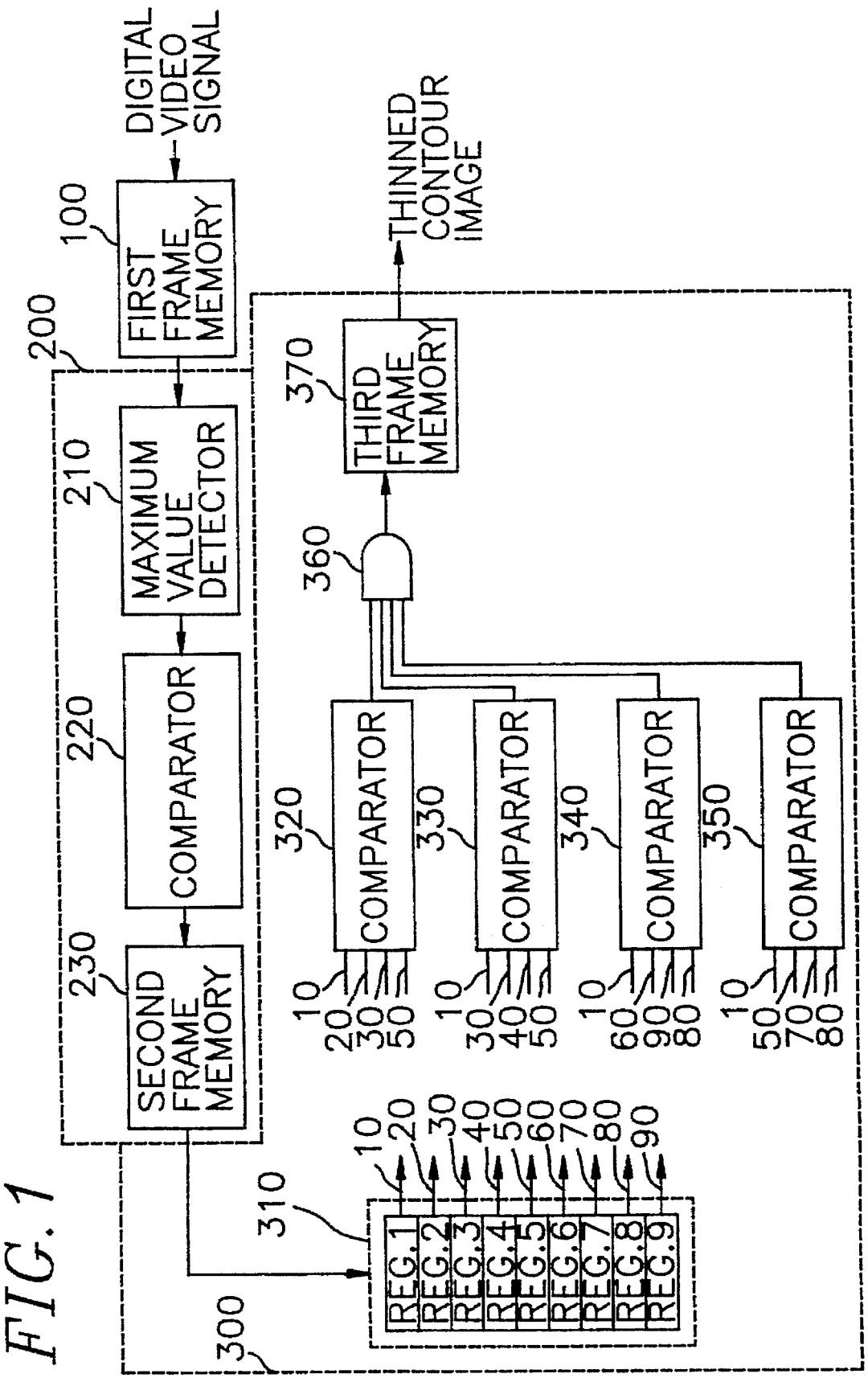
FIG. 1 describes a block diagram of a contour image detecting and thinning apparatus in accordance with the present invention.

Referring to FIG. 1, there is shown a block diagram of a contour image detecting and thinning apparatus in accordance with the present invention. An input digital video signal is stored as a current or a previous frame signal in a first frame memory 100 which is connected to a contour detection unit 200. The frame signal from the first frame memory 100 is inputted to the contour detection unit 200 for detecting edge points on an object boundary in the video frame and generating a contour image of the object.

The contour detection unit 200 calculates edge magnitudes for all of the pixels in the video frame by using, e.g., Eq. 1 given below; and provides the contour image by allocating the calculated edge magnitudes to their respective pixel locations. Eq. 1 represents an edge magnitude at a pixel location (x, y), which is defined as:

$$E(x, y) = \max\{I(x, y) - I(x+i, y+j)\} \quad \text{(Eq. 1)}$$

(where, $-1 \leq i, j \leq 1$)

wherein I(x, y) and I(x+i, y+j) represent the pixel values of an image at the pixel locations (x, y) and (x+i, y+j).

More specifically, in order to determine an edge magnitude for a pixel ("target pixel") in the video frame, the target pixel is retrieved from the first frame memory 100 and provided to a maximum value detector 210. Thereafter, neighboring 8 pixels surrounding the target pixel are sequentially retrieved from the first frame memory 100 and provided to the maximum value detector 210, under the control of a system controller (not shown). The maximum value detector 210 subtracts each of the neighboring 8 pixels from the target pixel, and provides a maximum pixel difference having a largest value to a comparator 220. At the comparator 220, the maximum pixel difference from the maximum value detector 210 is compared with a predetermined threshold value TH to detect edge points. Generally, the predetermined threshold value TH is 6, said value 6 being an appropriate value to eliminate noise effects. The maximum pixel difference is fed to a second frame memory 230 and stored therein as the edge magnitude for the target pixel if it is larger than TH; otherwise, "zero" is fed to the second frame memory 230 and stored therein as the edge magnitude for the target pixel. The pixel location represents an edge point if the maximum pixel difference exceeds the TH. In this manner, edge magnitudes for all of the pixels in the video frame are determined and stored in the second frame memory 230, wherein the locations of the detected edge points constitute the contour image. The contour image provides boundary information for tracing the object boundary in the image, wherein the boundary information includes position data of the pixels along the boundary of the object in the video frame and edge magnitudes corresponding to the respective pixel positions.

Figures 2, 3:
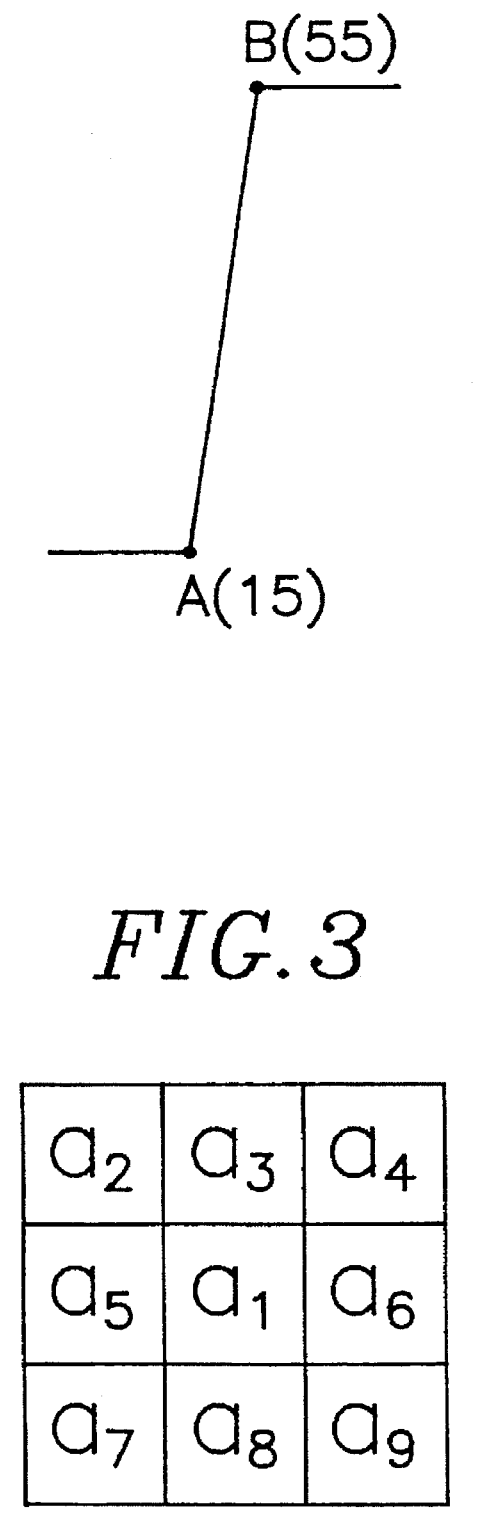

Referring to FIG. 2, there is illustrated a diagram explaining the edge point detection scheme employed in the present invention. Assuming that there are two one-dimensional pixels A and B whose pixel values are 15 and 55, and using the known edge detection technique employing the sobel operator, a gradient magnitude at a pixel location is defined in terms of the absolute value of a directional gradient at the pixel location, wherein an edge point represents a pixel position whose gradient magnitude exceeds the predetermined threshold value TH. Accordingly if the TH value is smaller than the absolute pixel difference between A and B, both A and B are detected as edge points.

On the other hand, in accordance with the present invention, pixel B is selected as an edge point but not A because the pixel difference A–B, i.e., –40, is smaller than the predetermined threshold value TH, i.e., 6.

Referring back to FIG. 1, the contour image data generated by the contour detection unit 200 is provided to a contour thinning unit 300 for further processing. The contour thinning unit 300 compares each of the edge magnitudes for the edge points in the contour image with a number of edge magnitude sets, thereby thinning the contour image, each of the edge magnitude sets having a series of three edge magnitudes selected from the edge magnitudes corresponding to those neighboring 8 pixels surrounding said each edge point.

In accordance with the present invention, the system controller (not shown) retrieves an edge magnitude ("target edge magnitude") and neighboring 8 edge magnitudes surrounding the target edge magnitude from the second frame memory 230, which are provided to a register group 310, wherein the target edge magnitude represents one of the edge magnitudes corresponding to the edge points in the contour image. The register group 310 is comprised of conventional registers, and connected to a number of comparators 320 to 350.

Specifically, the target edge magnitude is stored in a register REG. 1, and the neighboring 8 edge magnitudes are stored in registers REG. 2 to REG. 9, respectively. In FIG. 3, there are shown an exemplary target edge magnitude a1 and its neighboring 8 edge magnitudes a2 to a9. Said a1 is stored in REG. 1, and a2 to a9 are stored in REGs. 2 to 9, respectively.

In a preferred embodiment of the present invention, the target edge magnitude a1 from REG. 1 is fed to each of the four comparators 320 to 350 through a line 10 and is compared with each edge magnitude in four edge magnitude sets, i.e., (a2, a3, a5), (a3, a4, a6), (a6, a8, a9) and (a5, a7, a8), each edge magnitude set having a series of three edge magnitudes selected from the neighboring 8 edge magnitudes a2 to a9 around the target edge magnitude a1. Each of the 4 comparators has any one set among the four edge magnitude sets as its input.

In another embodiment of the present invention, the target edge magnitude a1 is fed to 8 comparators for its comparison with each edge magnitude in 8 edge magnitude sets, i.e., (a2, a3, a4), (a3, a4, a6), (a4, a6, a9), (a6, a8, a9), (a7, a8, a9), (a5, a7, a8), (a2, a5, a7) and (a2, a3, a5), each of the 8 comparators also having one of the eight edge magnitude sets as its input.

In a preferred embodiment of the present invention, each of the comparators 320 to 350 generates a logic low signal to an AND gate 360 if the target edge magnitude a1 is smaller than all of the edge magnitudes within the respective edge magnitude sets; otherwise, it generates a logic high signal to the AND gate 360. In other words, the comparator 320 compares the target edge magnitude a1 on the line 10 from REG. 1 with edge magnitudes a2, a3 and a5 on lines 20, 30 and 50 from REG. 2, REG. 3 and REG. 5, and generates a logic low signal to the AND gate 360 if a1 is smaller than a2, a3 and a5; otherwise, it generates a logic high signal to the AND gate 360. Similarly, the comparators 330 to 350 perform the same function as the comparator 320 with respect to their inputs, thereby generating a logic low or high signal to the AND gate 360. The AND gate 360 performs a logic AND operation for its 4 inputs, and generates a logic low or high signal to a third frame memory 370. The AND gate 360 generates the logic high signal only if all inputs thereto are logic high. The logic signal from the AND gate 360 updates the third frame memory 370 which is pre-set to "zeros" by the system controller (not shown). In this manner, the edge magnitudes for all of the edge points in the contour image are processed through the contour thinning unit 300 of the present invention.

Figure 4:
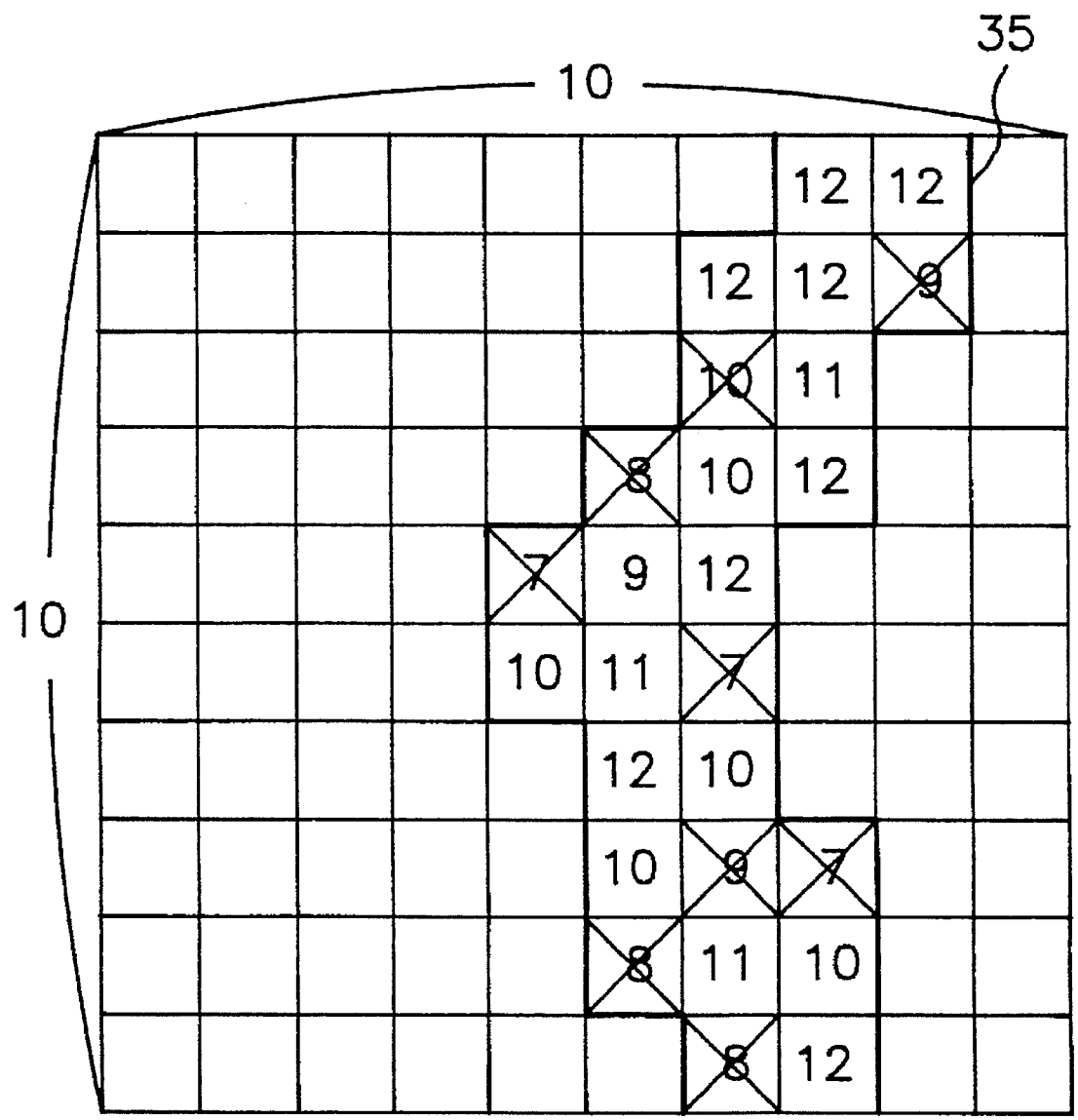
FIG. 4 shows an exemplary frame to explain the thinning process of a contour image in accordance with the present invention.

Referring to FIG. 4, there is shown an exemplary frame of 10×10 pixels. If edge points and their edge magnitudes detected by the contour detecting unit 200 are the same as that shown in FIG. 4, the X-marked edge points are eliminated through the contour thinning unit 300. That is, the contour image 35 is thinned by the elimination of the X-marked edge points through the use of the contour thinning unit 300, and the thinned contour image is stored in the third frame memory 370. The thinned contour image from the frame memory 370 can, therefore, represent object boundaries in the video frame with a reduced number of edge points.

While the present invention has been shown and described with respect to the particular embodiments, it will be apparent to those skilled in the art that many changes and modifications may be made without departing from the spirit and scope of the invention as defined in the appended claims.

What is claimed is:

1. An apparatus, for use in a video signal encoder, for detecting and thinning a contour image of an object in a video frame, which comprises:

means for calculating edge magnitudes for pixels in the video frame and detecting edge points, wherein each of the edge points represents a pixel position whose edge magnitude is larger than a predetermined threshold value, and each of said edge magnitudes represents a pixel difference between a pixel in the video frame and neighboring pixels surrounding the pixel;

means for generating a contour image constituted by the detected edge points, wherein the contour image provides boundary information for tracing the boundary of the object in the video frame, said boundary information including position data of the pixels along the boundary of the object in the video frame and edge magnitudes corresponding to the respective pixel positions; and means for thinning the contour image by comparing an edge magnitude for each of the edge points with each of the edge magnitudes included in a plurality of edge magnitude sets, each of the edge magnitude sets having a series of three edge magnitudes selected from the edge magnitudes corresponding to the neighboring pixels surrounding said each of the edge points.

2. The apparatus according to claim 1, wherein said thinning means includes:

memory means for sequentially storing a target edge magnitude and neighboring 8 edge magnitudes surrounding said target edge magnitude to thereby generate the target edge magnitude and the plurality of edge magnitude sets, wherein each of the edge magnitude sets has a series of three edge magnitudes selected from the neighboring 8 edge magnitudes, the target edge magnitude representing an edge magnitude corresponding to one of the edge points in the contour image; and a plurality of comparison means, each comparison means for comparing the target edge magnitude with each of the three edge magnitudes in the corresponding edge magnitude set, wherein each of the comparison means generates a logic low signal if the target edge magnitude is smaller than all the edge magnitudes in each edge magnitude set; and if otherwise, it generates a logic high signal.

3. A method for detecting and thinning a contour image of an object in a video frame, comprising the steps of:

(a) calculating edge magnitudes for pixels in the video frame and detecting edge points, wherein each of the edge points represents a pixel position whose edge magnitude is larger than a predetermined threshold value, and each of said edge magnitudes represents a pixel difference between a pixel in the video frame and neighboring pixels surrounding the pixel;

(b) generating a contour image constituted by the detected edge points, wherein the contour image provides boundary information for tracing the boundary of the object in the video frame, said boundary information including position data of the pixels along the boundary of the object in the video frame and edge magnitudes corresponding to the respective pixel positions; and (c) thinning the contour image by comparing an edge magnitude for each of the edge points with each of the edge magnitudes included in a plurality of edge magnitude sets, each of the edge magnitude sets having a series of three edge magnitudes selected from the edge magnitudes corresponding to the neighboring pixels surrounding said each of the edge points.

4. The method according to claim 3, wherein said step (c) includes the steps of:

(c1) storing a target edge magnitude and neighboring 8 edge magnitudes surrounding said target edge magnitude, wherein the target edge magnitude represents an edge magnitude corresponding to one of the edge points in the contour image;

(c2) dividing the neighboring 8 edge magnitudes into the plurality of edge magnitude sets, each of the edge magnitude sets having a series of three edge magnitudes selected from the edge magnitudes corresponding to the neighboring pixels surrounding said each edge point; and (c3) comparing the target edge magnitude with each edge magnitude included in the respective edge magnitude sets to generate a logic low signal if the target edge magnitude is less than each of the edge magnitudes in the respective edge magnitude sets; and if otherwise, to generate a logic high signal.

* * * * *